(12) United States Patent
Santelli

(10) Patent No.: US 7,155,997 B2
(45) Date of Patent: Jan. 2, 2007

(54) MOTOR VEHICLE DIFFERENTIAL

(75) Inventor: Franck Santelli, Cormeilles-En-Parisis (FR)

(73) Assignee: Peugeot Citroen Automobiles S.A., Velizy Villacoublay (FR)

( * ) Notice: Subject to any disclaimer, the term of this patent is extended or adjusted under 35 U.S.C. 154(b) by 174 days.

(21) Appl. No.: 10/502,572

(22) PCT Filed: Feb. 6, 2003

(86) PCT No.: PCT/FR03/00377

§ 371 (c)(1),
(2), (4) Date: Jan. 18, 2005

(87) PCT Pub. No.: WO03/067122

PCT Pub. Date: Aug. 14, 2003

(65) Prior Publication Data

US 2005/0164821 A1    Jul. 28, 2005

(30) Foreign Application Priority Data

Feb. 8, 2002  (FR) .................................. 02 01572

(51) Int. Cl.
*F16H 57/02* (2006.01)
(52) U.S. Cl. ........................................ 74/607; 475/336
(58) Field of Classification Search ................ 475/336, 475/230; 74/607, 606 R, 608, 609
See application file for complete search history.

(56) References Cited

U.S. PATENT DOCUMENTS

| | | | | |
|---|---|---|---|---|
| 2,818,129 A | * | 12/1957 | De Vere Harnett | 180/339 |
| 3,874,251 A | * | 4/1975 | Lapitsky et al. | 475/230 |
| 4,363,248 A | * | 12/1982 | Brisabois | 475/230 |
| 4,402,238 A | * | 9/1983 | Craig | 475/230 |
| 4,722,244 A | * | 2/1988 | Tsuchiya et al. | 475/230 |
| 4,977,796 A | * | 12/1990 | Littke | 74/665 T |
| 5,647,814 A | * | 7/1997 | Krisher | 475/230 |
| 5,713,247 A | | 2/1998 | Skelton et al. | |
| 6,045,479 A | * | 4/2000 | Victoria et al. | 475/230 |
| 6,061,907 A | * | 5/2000 | Victoria et al. | 29/893.1 |
| 6,074,321 A | | 6/2000 | Maeda et al. | |
| 6,176,152 B1 | * | 1/2001 | Victoria et al. | 74/607 |
| 6,976,929 B1 | * | 12/2005 | Bonanti | 475/230 |

* cited by examiner

*Primary Examiner*—Roger Pang
*Assistant Examiner*—Justin K. Holmes
(74) *Attorney, Agent, or Firm*—Leydig, Voit & Mayer, Ltd.

(57) ABSTRACT

The invention concerns a motor vehicle differential comprising a case including perforations; differential pinion shafts, each differential pinion shaft having an end accommodated by a perforation; and a cap; wherein the differential pinion shafts are locked in translation relative to the differential case by the cap, the cap being mounted on at least the part of the differential case traversed by the shafts so as to cover at least partially the perforations.

6 Claims, 2 Drawing Sheets

MOTOR VEHICLE DIFFERENTIAL

FIELD OF THE INVENTION

The present invention concerns a motor vehicle differential.

BACKGROUND OF THE INVENTION

Such a differential is comprised of a differential case that can be driven by a ring ear integral with this case, satellites rotatably mounted in the case via shafts passing through it that are immobilized in translation relative to the case, and two sun gears, rotatably mounted in the case, in engagement with the satellites.

Various solutions have been proposed in the past for blocking translation of the satellite shafts in the case.

One of these solutions provides for the use of a ring seated in a reception groove made in each perforation of the case body through which the corresponding satellite shaft is introduced. This solution necessitates not only machining the grooves but also has the disadvantage that the grooves greatly weaken the strength of the differential case body.

Another solution consists in providing a specific locking screw for each satellite shaft. This solution has the major inconvenience of being bulky.

Yet another solution provides for the use of a safety pin for each satellite shaft, partially implanted in the body of the differential case while projecting into the perforation of this body that permits passage of the satellite shaft. This solution requires machining the perforations for passage and implantation of the safety pins.

A solution is also known that utilizes separate plates detachably fastened to the body of the differential case and each having a tongue sealing the corresponding perforation in the differential case for passage of the satellite shaft. However, the use of separate plates is dependent on the assembly system of the driving ring gear of the differential case.

The present invention proposes to eliminate the above shortcomings of the various known solutions that permit blocking translation of the satellite shafts in the differential case.

BRIEF SUMMARY OF THE INVENTION

For this purpose, the invention proposes a motor vehicle differential comprised of a differential case that can be driven by a ring gear integral with the case, satellites rotatably mounted in the case via shafts traversing the case that are immobilized in translation relative to the case, and two sun gears rotatably mounted in the case and engaged with the satellites, and which is characterized in that the satellite shafts are immobilized in translation by a cap covering at least the part of the differential case traversed by the shafts such that the passage perforations for the shafts made through the peripheral wall of the differential case are at least partially covered.

The satellite shaft stopper cap is held in translation on the differential case.

The satellite shaft stopper cap preferably covers by conforming to the shape of the major portion of the differential case, and is immobilized in translation relative to this case by the annular end, opposite from the ring gear, supported against the inner race of the axle bearing mounted on a tubular support of the differential case.

According to one embodiment variant, the cap is made of plastic material.

According to another variant, the cap is made from stamped sheet metal.

The invention will be better understood, and other goals, characteristics, details and advantages of it will appear more clearly in the following explanatory description, with reference to the attached drawings, given merely by means of example illustrating an embodiment of the invention:

DETAILED DESCRIPTION OF THE INVENTION

Figure 1:
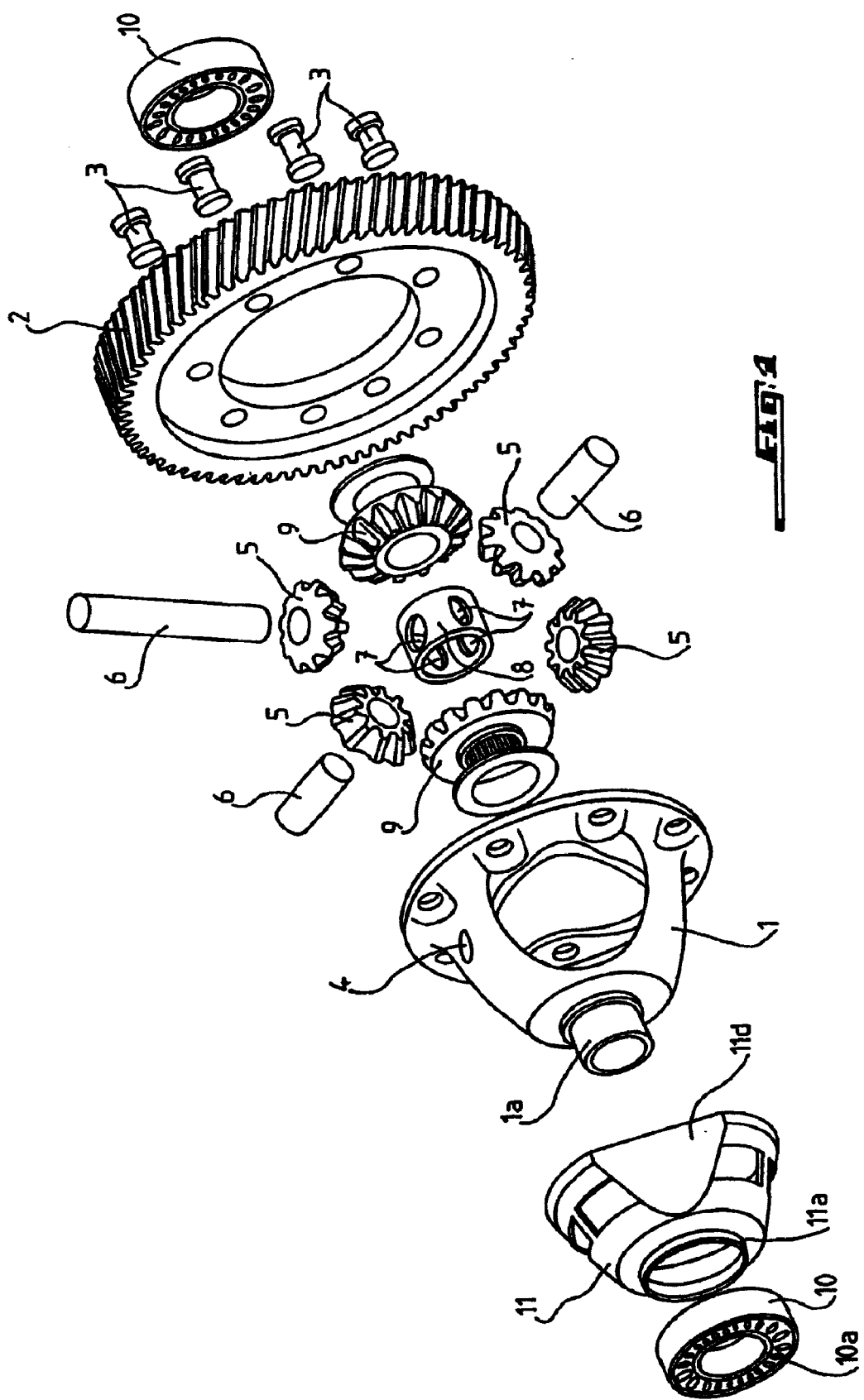
FIG. 1 is an exploded oblique view of a motor vehicle differential according to the invention.
Figure 3:
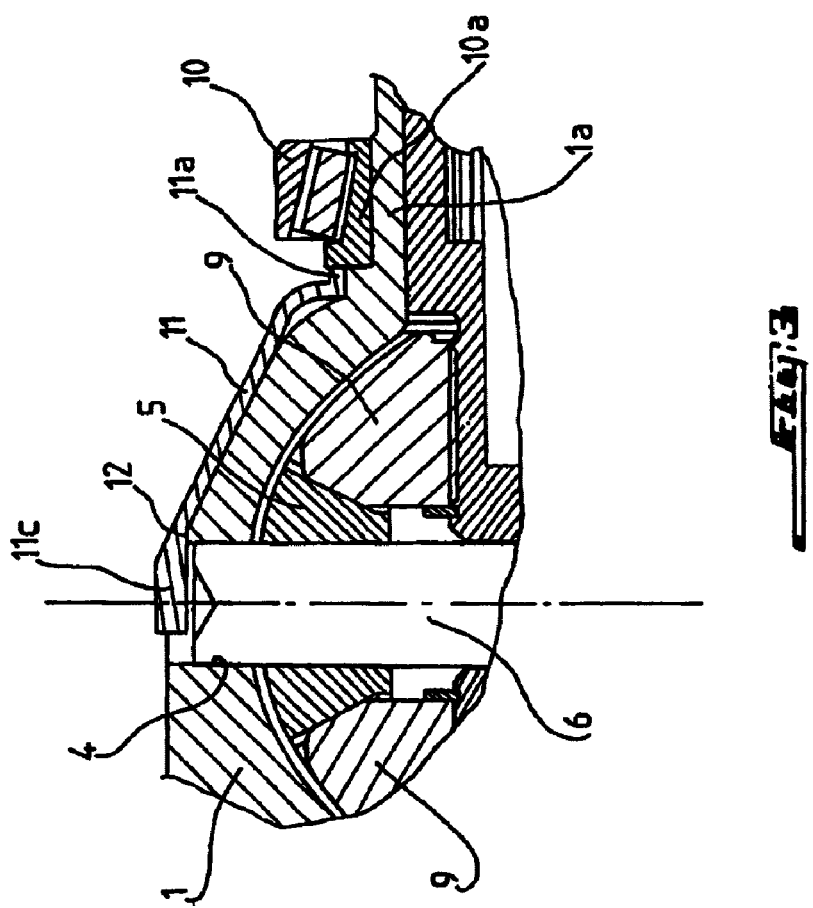
FIG. 3 is a partial cross section of the cap immobilizing a satellite shaft.

The motor vehicle differential as shown in the figures comprises a differential case 1 of general truncated form and a ring drive gear 2 of the case 1 detachably fastened to the case 1 by rivets 3 or other analogous means such as, e.g., fastening screws.

The differential case 1 has several perforations 4 passing through its peripheral wall that are angularly spaced equidistantly around the same circumference.

The differential is comprised of satellites 5 rotatably mounted in the case 1 via shafts 6 engaged from the outside in the perforations 4 by having their ends respectively accommodated in these perforations. The opposite end of each satellite shaft 6 located inside of the case 1 penetrates into a conjugate perforation 7 of a central cylindrical support piece 8.

The differential has two more sun gears 9 accommodated in the case 1 and engaged with the satellites 5.

As represented, the differential case 1 contains four satellites 5 mounted respectively on four shafts 6, only three of which are shown, the shafts 6 being located in the same plane and orthogonally with respect to one another.

Finally, the differential has two axle bearings 10 mounted at its ends in known fashion.

According to the invention, the satellite shafts 6 are immobilized in translation in their respective perforations 4 by a means forming cap 11 that covers at least the peripheral part of the differential case 1 where the perforations 4 are located so as to cover these perforations at least partially.

The cap 11 preferably covers by conforming to the shape of the major portion of the differential case 1 and is immobilized in translation relative to the case 1 by its annular end 11a, opposite from ring gear 2, supported against the inner race 10a of the bearing 10 mounted on a tubular support 1a of the case 1 and coaxial with the longitudinal shaft of the differential passing through latter's various components comprising the case 1, the sun gears 9, the central cylindrical piece 8 and the ring gear 2. The annular end 11b of the cap 11 opposite the part 11a can be shaped so as to extend over the external flattened parts 12 machined on the body of the case 1 parallel to the longitudinal axis of the differential and into which the perforations 4 respectively open. This annular part thus has its internal face opposite each flattened part of perforation 4, is plane and is located immediately next to the latter so as to permit only a very slight play to remain between it and the corresponding end of the satellite shaft 6.

Figure 2:
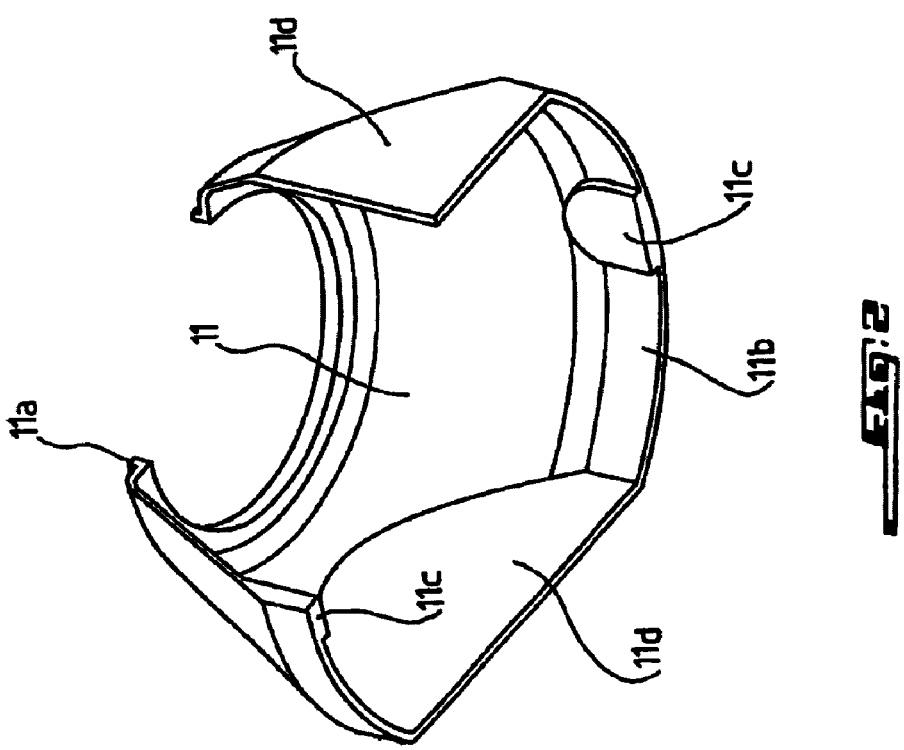
FIG. 2 is an oblique view of the cap of the invention that permits immobilizing in translation the satellite shafts of the differential of FIG. 1.

FIG. 2 more particularly represents such a conformation constituted by an internally projecting part 11c coming above the flattened part 12 of the corresponding perforation 4. This figure also shows that the cap 11 can be open, i.e., not completely covering the periphery of the differential case 1, and that it has two lateral walls or plane parallel sides 11d that cooperate with two parts of the lateral walls of this case for rotationally immobilizing the cap 11 relative to the case 1.

The cap 11 can be made of a plastic material or, according to one variant embodiment, of stamped sheet metal.

The order of assembly of the different components of the differential is as follows: The sun gears 9 and the satellites 5 are mounted in the differential case 1, and the shafts 6 of the satellites 5 are then mounted from the outside through the perforations 4. The stopper cap 11 of the shafts of the satellites 6 then is mounted on the differential case 1 before mounting the axle bearings 10.

The cap for stopping translation of the satellite shafts is a relatively simple, quite inexpensive structure, does not require particular machining, and is independent of the assembly of the ring gear to the differential case; the assembly or disassembly of each satellite shaft and of the internal components of the differential can be done with the ring gear assembled to the case.

The invention claimed is:

1. A motor vehicle differential comprising:
    a differential case, capable of being driven by a ring gear, the case comprising a peripheral wall including perforations and a tubular support;
    shafts transversing the case, the shafts passing through the perforations in the case;
    satellites rotatably mounted in the case via the shafts, the shafts being immobilized in translation relative to the case;
    two sun gears rotatably mounted in the case, the sun gears being in engagement with the satellites; and,
    a cap having an annular end, the cap covering a portion of the case;
    wherein the shafts are immobilized in translation by the cap, and the cap at least partially covers the perforations;
    wherein the cap is immobilized in translation relative to the case by the annular end opposite the ring gear; and,
    wherein an axle bearing having an inner race is mounted on the tubular support and the annular end of the cap is supported against the inner race of the axle bearing.

2. The differential according claim 1, wherein the cap of the shafts of the satellites is held in translation on the differential case.

3. The differential according to claim 2 wherein the cap is made of a plastic material.

4. The differential according to claim 2 wherein the cap is made of stamped sheet metal.

5. The differential according to claim 1, wherein the cap is made of a plastic material.

6. The differential according to claim 1, wherein the cap is made of stamped sheet metal.

* * * * *